US006444002B1

(12) United States Patent
Mai

(10) Patent No.: US 6,444,002 B1
(45) Date of Patent: Sep. 3, 2002

(54) NAIL SALON AIR PURIFICATION SYSTEM

(76) Inventor: Billy Mai, 615 Lakeshore Dr., Hillsborough, NC (US) 27278

( * ) Notice: Subject to any disclaimer, the term of this patent is extended or adjusted under 35 U.S.C. 154(b) by 0 days.

(21) Appl. No.: 09/395,519

(22) Filed: Sep. 14, 1999

(51) Int. Cl.[7] .......................... B01D 35/30; B01D 39/10

(52) U.S. Cl. .......................... 55/385.1; 55/417; 55/467; 55/DIG. 18; 454/56

(58) Field of Search ............................ 55/385.1, 385.2, 55/417, 467, DIG. 18; 454/56, 62, 63, 67; 132/73

(56) References Cited

U.S. PATENT DOCUMENTS 4,852,468 A * 8/1989 Harris .................. 55/DIG. 18
5,336,128 A * 8/1994 Birdsong .................... 454/56
5,787,903 A * 8/1998 Blackshear ............... 132/73.5

* cited by examiner

*Primary Examiner*—David A. Simmons
*Assistant Examiner*—Robert A. Hopkins
(74) *Attorney, Agent, or Firm*—Olive & Olive, P.A.

(57) ABSTRACT

The invention provides a system for the purification of air in a nail salon by removing particles and fumes close to the point at which such pollutants are generated. In a first aspect of the invention, a nozzle connected to a vacuum source by a hose is supported on an articulated arm so as to be positionable immediately above a workbench surface and the hand of the customer. With the vacuum source activated, the nozzle collects small dust particles and fumes. The articulated arm is fitted with a moveable weight to stabilize the arm in a selected position. A further vacuum inlet is provided at the workbench surface to receive heavier particulate matter, such as nail and cuticle clippings. In a second embodiment of the invention, a hood with hand holes is mounted on the workbench surface for collecting dust and particles from clipping and grinding of nails. The hood has an upper vacuum inlet for collecting dust particles as well as fumes. The workbench has a vacuum inlet for receiving heavier particulate matter, such as nail and cuticle clippings. The vacuum source has a high efficiency filter for eliminating the majority of particles and fumes before the air is exhausted to the atmosphere.

6 Claims, 2 Drawing Sheets

NAIL SALON AIR PURIFICATION SYSTEM

BACKGROUND OF THE INVENTION

1. Field of the Invention

The present invention relates to the field of air purification and more particularly to the purification of air in a nail salon environment.

2. Background and Related Art

Nails are trimmed and decorated in nail salons across the country, and, indeed, throughout the world. The process of trimming involves clipping, grinding, and filing of the nails and trimming cuticles, all of which produces small pieces and dust. The process of decoration involves shaping the nails by grinding or filing and the application of a lacquer, or polish, that is solvent based; typically the solvent is acetone. The nails may also be decorated with a lacquer sprayed over the traditional polish with an air brush. Periodically, the polish must be removed, which is generally done with clear acetone solvent. Acetone is used because it is an effective solvent. As with most strong solvents, acetone is very volatile and has a strong odor. Acetone produces fumes that irritate the nose, throat, and lungs, and possibly have some long range health and environmental detriments.

All of the above described nail care operations generate a plethora of particles of various sizes and fumes that are dispensed into the air. The particles, both dust and small clippings, are basically unwanted, and they can irritate the nose, throat, and lungs of those who inhale them. The operations described thus produce a variety of air pollutants.

Exposure by a customer to this pollutant-laden air for a 30 minute to one hour time period is unpleasant and potentially harmful. This is especially objectionable because some of the customers of nail salons bring small children with them who are potentially more susceptible to air-borne pollutants. Furthermore, the shop personnel are typically exposed to the polluting chemicals and dust for many hours every day, perhaps for months or years.

Some nail salons have installed exhaust systems having one or more collection points in the shop ceiling. This type of system typically dispenses the collected dust and fume-laden air into the surrounding atmosphere. This practice has two major drawbacks: (1) the customers and shop personnel are exposed to the dust and fumes in the shop air before they reach the ceiling and are exhausted to the atmosphere, and (2) dispensing the fumes and dust into the atmosphere spreads, rather than avoids, the pollution problem. This means that the air surrounding the nail salon in which a ceiling-mounted exhaust system is used smells from acetone fumes and carries excess dust particles.

Therefore, it is an object of the present invention to provide a system for the purification of air in a nail salon.

It is a further object of the present invention to provide a system for the purification of air in a nail salon in a manner to reduce exposure of customers and shop personnel to fumes and dust particles.

It is another object of the present invention to provide a system for the purification of air in a nail salon in a manner that minimizes dispersing of exhausted fumes and particles to the atmosphere.

These and additional objects of the present invention will become apparent through the description, drawings, and claims to follow.

SUMMARY OF THE INVENTION

The present invention provides a system for the purification of air within a nail salon and minimizes the dispersing of fumes and particles to the atmosphere. The system of the invention collects nail and cuticle clippings from a nail trimming station through a table-mounted suction inlet that is enclosed within a hood and has a collecting screen positioned below the inlet. The system collects nail grinding dust and solvent fumes from a nail shaping and polishing station through a table-mounted suction inlet and a suction nozzle that is selectively positionable close to the work site. All the suction inlets and nozzles in the salon are connected to a vacuum source through hoses each having a valve to enable selective shut-off.

DESCRIPTION OF THE DRAWINGS

In order that the invention will become more clearly understood it will be disclosed in detail with reference to the accompanying drawings, in which.

DETAILED DESCRIPTION OF THE INVENTION

The present invention provides apparatus for maintaining air quality in a nail care facility or nail salon. The invention includes two forms of apparatus that are each adapted to deal with pollution problems occurring at two distinct workstations in the nail care facility, the workstation used for trimming and that used for shaping and applying polish.

Figure 2:
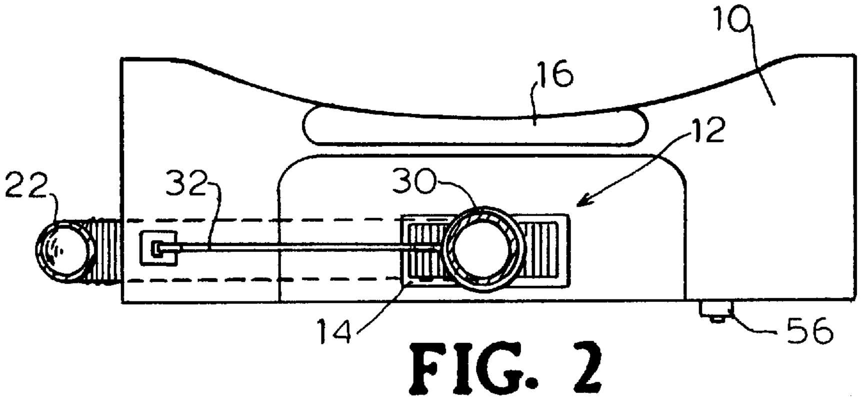
FIG. 2 is a top plan view of the air purification system of FIG. 1 wherein portions of the ductwork has been omitted for clarity.
Figure 1:
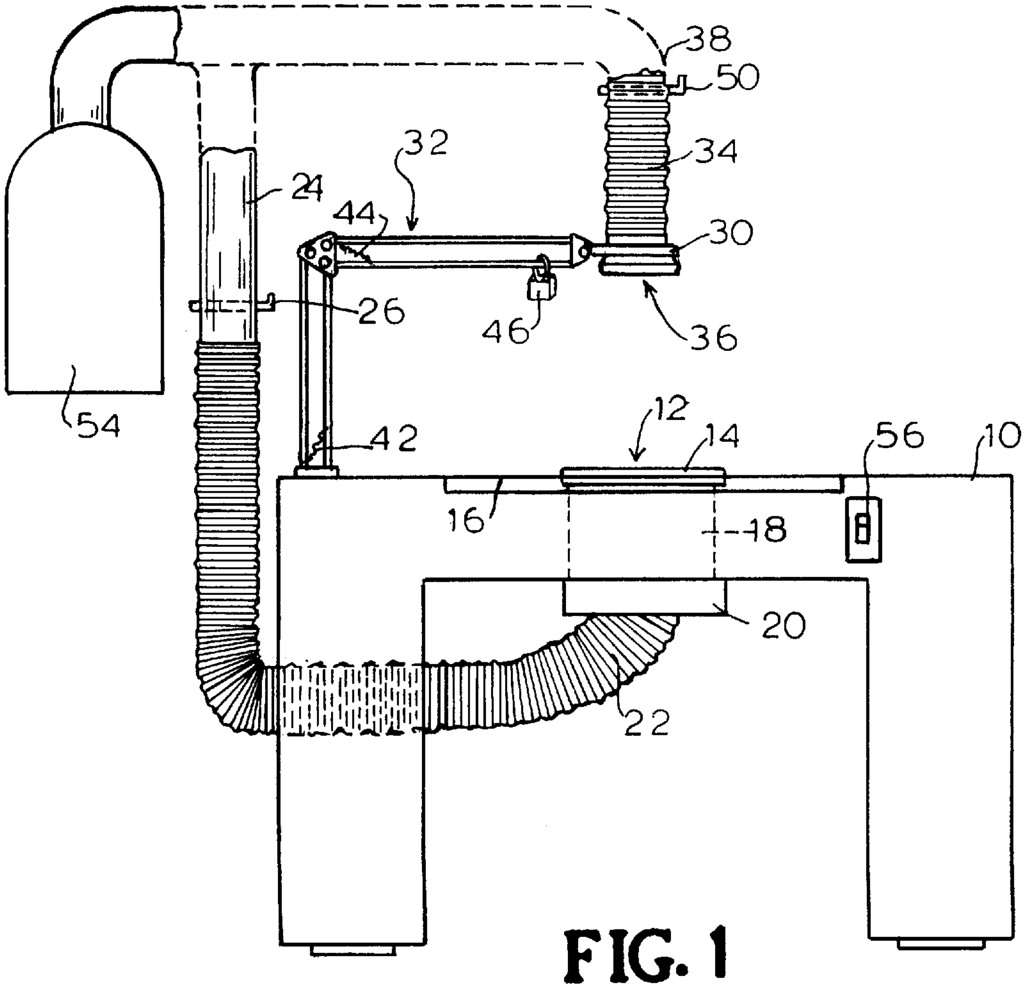
FIG. 1 is a front elevation view of the air purification system of the invention as it is applied to a nail shaping and polishing station.

Referring now to FIGS. 1 and 2, the apparatus of the present invention for the purification of air is illustrated as it is used in connection with a workstation for shaping and applying polish to nails. Workbench 10 mounts the apparatus of the present invention so as to be operative in the vicinity of work site 12, including cushion 16, where the customer rests his or her arms during the process of nail shaping and polishing.

Workbench 10 is fitted with a suction inlet 14 mounted in its top surface that conducts air to plenum 18. A first end of hose 22 is connected to an outlet of plenum 18 and the second end of hose 22 is connected to rigid pipe 24. Hose 22 and pipe 24 combine to form an air conduit. Pipe 24 connects to an inlet of vacuum source 54 (via dashed line connector), which may be located remote from workbench 10 so as to minimize noise. A valve 26 is fitted into pipe 24 to optionally block air flow without deactivating vacuum source 54. A suitable vacuum source for use in the present invention is a 6.25 hp Wet-Dry Vac, supplied by Rigid Tool Company, including a high efficiency "hepa" filter. A screen filter 20 is removably mounted in the lower portion of plenum 18 for easy removal of trapped nail and cuticle particles. Switch 56 is employed to activate vacuum source 54. Activation of vacuum source 54, with valve 26 in the open position, will draw heavier dust and nail particles through suction inlet 14 to be trapped in filter 20 during nail clipping and grinding operations.

Continuing to refer to FIGS. 1 and 2, nozzle 30 is supported above work site 12 on articulated arm 32, such as that commonly found to mount a desk lamp. A screen 36 is preferably provided within nozzle 30 to prevent unwanted light weight items, e.g., a tissue, from being sucked into nozzle 30, but will allow small particles and fumes to be drawn in. Nozzle 30 mounts to hose 34, which connects to pipe 38. Pipe 38 is fitted with valve 50 intermediate nozzle 30 and the connection of pipe 38 to vacuum source 54 to interrupt air flow when closed. Hose 34 and pipe 38 comprise an air conduit. Nozzle 30 receives lighter airborne particles and fumes when vacuum source 54 is operative and valve 50 is open. When nozzle 30 and suction inlet 14 are both operating, the system of the present invention will effectively remove heavy particles, light particles, and fumes from the air, thus maintaining a relatively clean, relatively odor-free environment. The system is configured, as already noted, so that with vacuum source 54 operating, either suction inlet 14 below the hands of the customer or nozzle 30 above the hands of the customer may be active, depending on the treatment being performed. For example, when nails are being clipped, the particles are relatively large and only suction inlet 14 in the top surface of workbench 10 is needed. When nails are being polished, fumes are produced that tend to readily enter the air, and only nozzle 30 above workbench 10 is needed. It is feasible to operate both suction inlet 14 and nozzle 30 at the same time.

Referring further to FIG. 1, the present invention recognizes that arm 32, being fitted with springs 42 and 44, tends to raise into the air unless it is held down by a sufficient weight. In other words, springs 42 and 44 are used to counter-bias arm 32 against a weight placed on its distal end. When only a small weight, or essentially no weight, bears on the distal end of arm 32, springs 42 and 44 tend to lift arm 32 up from the position in which it has been placed. Nozzle 30 and hose 34 are relatively light weight; nozzle 30 being preferably aluminum and hose 34 being preferably made of plastic, and most preferably a plastic sheet wrapped wire helix known as dryer vent hose. Therefore, nozzle 30 and hose 34 provide little downward force on arm 32. Both nozzle 30 and hose 34 are supported from above, reducing the small downward force exerted on arm 32. Bias means, in the form of spring 42 at the base of arm 32 and spring 44 at the middle joint of arm 32, lift the distal end of arm 32 upward. Since the downward force of nozzle 30 and hose 34 is small, the springs 42 and 44 tend to overcome their effect and lift arm 32 up. This condition of excessive counter bias is compensated, according to the invention, by selectively positionable weight 46, assembled to arm 32 by a flexible loop. When the user of the present invention desires nozzle 30 to be in a downward position, weight 46 is moved toward the distal end of arm 32 to add weight thereto. When the user desires nozzle 30 to be up and out of the way, weight 46 is moved away from the distal end of arm 32 to remove weight therefrom, thus allowing springs 42 and 44 to lift arm 32 upward.

Figure 3:
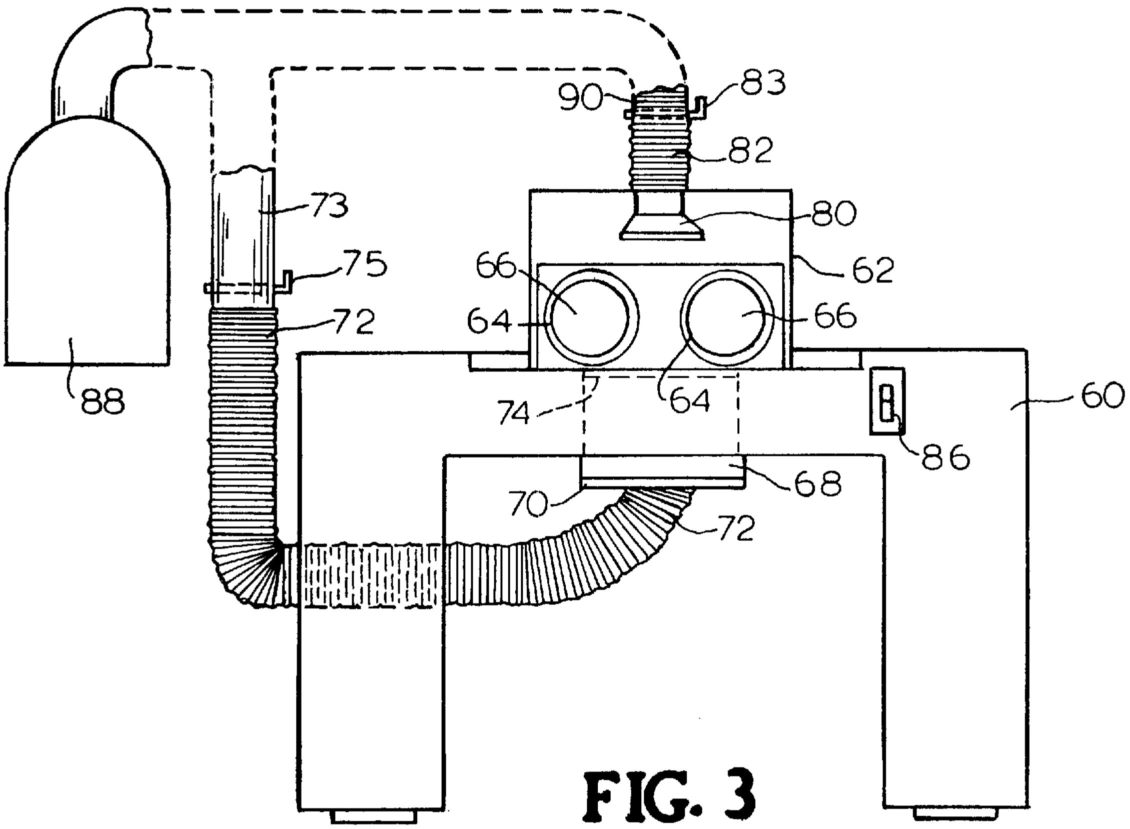
FIG. 3 is a front elevation view of the air purification system of the invention applied to a nail trimming station.
Figure 4:
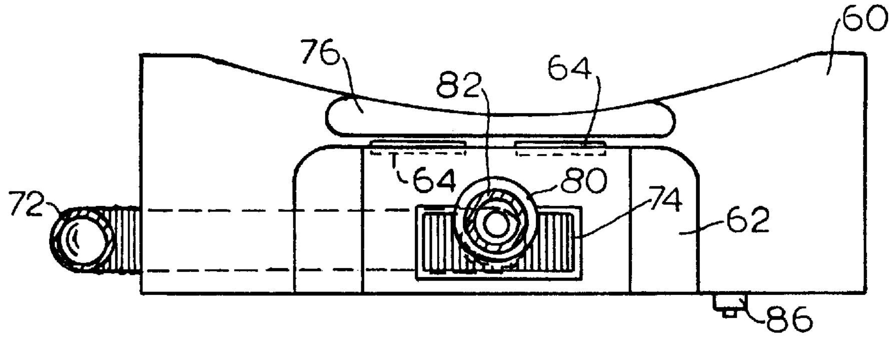
FIG. 4 is a top plan view of the air purification system of the nail trimming station illustrated in FIG. 3 wherein portions of the ductwork have been omitted for clarity.

A second embodiment of the invention, adapted particularly for use in the operations of trimming and heavy grinding, is illustrated in FIGS. 3 and 4. Workbench 60 is fitted with a transparent hood 62 that is placed over the top surface of workbench 60 and suction inlet 74. Nail salon workers are able to see the hands and nails of their customers through the transparent structure of hood 62. Hood 62 has a pair of openings 66, lined with cuffs 64, formed through a front wall thereof. Cuffs 64 prevent discomfort of the hands and wrists of a customer when they are inserted through openings 66 for work to be done on the customer's nails. Cushion 76 allows the customer to rest his or her arms during the process of trimming and heavy grinding. Suction inlet 74, in the top surface of workbench 60, is connected through plenum 68 and filter 70 to hose 72, which, in tum, connects to the vacuum inlet of vacuum source 88 (via dashed line connector) and is activated by switch 86.

Nozzle 80 is attached to and is supported by the top wall of transparent hood 62. Nozzle 80 connects to vacuum source 88 via hose 82. Nozzle 80 is used when one desires to remove fumes and additional dust from within hood 62. Switch 86 activates vacuum source 88. A valve 83 is fitted into hose 82 to optionally block air flow without deactivating vacuum source 88.

A first end of hose 72 is connected to a suction inlet 74, in the top surface of workbench 60, and the second end of hose 72 is connected to rigid pipe 73. Hose 72 and pipe 73 combine to form an air conduit. Pipe 73 connects to an inlet of vacuum source 88 (via dashed line connectors), which may also be located remote to from workbench 60 so as to minimize noise. A valve 75 is fitted into pipe 73 to optionally block air flow without deactivating vacuum source 88. It is feasible to operate both suction inlet 74 and nozzle 80 simultaneously.

The above detailed description of the preferred embodiments of the invention sets forth the best mode contemplated by the inventor for carrying out the invention at the time of filing this application and is provided by way of example and not as a limitation. Accordingly, various modifications and variations obvious to a person of ordinary skill in the art to which it pertains are deemed to lie within the scope and spirit of the invention as set forth in the following claims.

What is claimed is:

1. Apparatus for the purification of air in a nail salon, comprising:

(a) a vacuum source having a vacuum inlet;

(b) a first conduit having a first end connected to said vacuum inlet and a second end being positionable above a workstation in said nail salon;

(c) a second conduit having a first end connected to said vacuum inlet and a second end mounted below said workstation;

(d) said second end of said first conduit and said second end of said second conduit each being fitted with a screen;

(e) first valve means mounted in said first conduit intermediate said first end and said second end; and (f) second valve means mounted in said second conduit intermediate said first end and said second end.

2. Apparatus for the purification of air in a nail salon as claimed in claim 1 wherein said second end of said first conduit is supported above said workstation by a biased, articulated arm.

3. Apparatus for the purification of air in a nail salon as claimed in claim 1 wherein said vacuum source comprises a high efficiency filter for minimizing the dispersion of pollutants to the atmosphere.

4. Apparatus for the purification of air in a nail salon as claimed in claim 2, wherein said biased, articulated arm is fitted with a positionable weight adapted to stabilize the arm in a selected position.

5. Apparatus for the purification of air in a nail salon, comprising:

(a) a vacuum source:

(b) a hood mounted on a workstation in said nail salon and having at least one opening adapted for receiving a hand therethrough;

(c) a hose for connecting said hood to said vacuum source; and (d) a valve disposed in said hose.

6. Apparatus for the purification of air in a nail salon as claimed in claim 5 wherein said vacuum source comprises a high efficiency filter for minimizing the dispersion of pollutants to the atmosphere.

* * * * *